(12) United States Patent
Inoue

(10) Patent No.: US 9,191,547 B2
(45) Date of Patent: Nov. 17, 2015

(54) IMAGE READING APPARATUS, IMAGE FORMING APPARATUS, STORAGE MEDIUM, AND IMAGE READING METHOD

(71) Applicant: KYOCERA Document Solutions Inc., Osaka (JP)

(72) Inventor: Takashi Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/525,388

(22) Filed: Oct. 28, 2014

(65) Prior Publication Data

US 2015/0116792 A1 Apr. 30, 2015

(30) Foreign Application Priority Data

Oct. 31, 2013 (JP) .................. 2013-227307

(51) Int. Cl.
| | |
|---|---|
| *H04N 1/04* | (2006.01) |
| *H04N 1/40* | (2006.01) |
| *H04N 1/10* | (2006.01) |
| *H04N 1/00* | (2006.01) |

(52) U.S. Cl.
CPC ....... *H04N 1/40056* (2013.01); *H04N 1/00018* (2013.01); *H04N 1/00034* (2013.01); *H04N 1/00082* (2013.01); *H04N 1/10* (2013.01); *H04N 2201/0081* (2013.01); *H04N 2201/0434* (2013.01)

(58) Field of Classification Search
CPC . H04N 5/2254; H04N 9/045; H04N 13/0014; H04N 13/0037; H04N 13/0239; H04N 13/0242; H04N 13/0257; H04N 13/0271; H04N 13/0278; H04N 13/0402; H04N 13/0409; H04N 13/0422; H04N 13/0468

USPC ........ 358/474, 504, 475, 1.16, 1.9, 3.09, 487, 358/505; 382/134, 112, 195; 399/83, 110, 399/258, 262
See application file for complete search history.

(56) References Cited

U.S. PATENT DOCUMENTS

| | | | | | |
|---|---|---|---|---|---|
| 4,674,877 | A | * | 6/1987 | Bullinga | 356/300 |
| 5,253,427 | A | * | 10/1993 | Bartlett | 33/501.08 |
| 5,886,342 | A | * | 3/1999 | Matsui | 250/208.1 |
| 6,587,227 | B1 | * | 7/2003 | Fullerton | 358/474 |
| 6,603,580 | B1 | * | 8/2003 | Taillie | 358/474 |
| 7,072,527 | B1 | * | 7/2006 | Nako | 382/290 |
| 7,253,427 | B2 | * | 8/2007 | Spears et al. | 250/559.38 |
| 7,548,352 | B2 | * | 6/2009 | Sakurai et al. | 358/475 |
| 7,593,143 | B2 | * | 9/2009 | Herloski | 358/474 |
| 8,089,664 | B2 | * | 1/2012 | Yokochi | 358/474 |
| 2013/0135359 | A1 | * | 5/2013 | Gally et al. | 345/690 |

FOREIGN PATENT DOCUMENTS

JP 2009-053241 A 3/2009

* cited by examiner

*Primary Examiner* — Negussie Worku
(74) *Attorney, Agent, or Firm* — Studebaker & Brackett PC

(57) ABSTRACT

An image reading apparatus irradiates an object with light and reads an image on or of the object. The image reading apparatus includes a table on which the object is placed, a planar light source configured to emit light to the object, a range-finding section configured to measure a distance between the table and the object, and a control section configured to cause the planar light source to entirely or partially emit light. The control section controls a light emitting portion of the planar light source thereby to control a light collection spot for the planar light source to a position based on a measurement value obtained by the range-finding section.

14 Claims, 12 Drawing Sheets

IMAGE READING APPARATUS, IMAGE FORMING APPARATUS, STORAGE MEDIUM, AND IMAGE READING METHOD

INCORPORATION BY REFERENCE

The present application claims priority under 35 U.S.C. §119 to Japanese Patent Application No. 2013-227307, filed Oct. 31, 2013. The contents of this application are incorporated herein by reference in their entirety.

BACKGROUND

The present disclosure relates to image reading apparatuses, image forming apparatuses, storage media, and image reading methods.

There has been known an image reading apparatus that reads an image on or of an original document (object) by irradiating the original document with light emitted from a light source and detecting the light reflected off the original document using an imaging device. Such an image reading apparatus is used in a scanner, a copier, a facsimile machine, or the like.

There has also been known an image reading apparatus including an organic electroluminescence (EL) device as a light source. For example, an image reading apparatus has been proposed that efficiently irradiates an object with light by bending an organic EL device along the width of the organic EL device.

SUMMARY

An image reading apparatus according to the present disclosure irradiates an object with light and reads an image on or of the object. The image reading apparatus according to the present disclosure includes a table on which the object is placed, a planar light source configured to emit light to the object, a range-finding section configured to measure a distance between the table and the object, and a control section configured to cause the planar light source to entirely or partially emit light. The control section controls a light emitting portion of the planar light source thereby to control a light collection spot for the planar light source to a position based on a measurement value obtained by the range-finding section.

An image forming apparatus according to the present disclosure includes an image reading apparatus according to the present disclosure and an image forming section configured to form an image based on data of an image read by the image reading apparatus.

A storage medium according to the present disclosure is a non-transitory computer-readable storage medium storing therein a program as described below. The program stored in the storage medium causes a computer to execute: irradiating, by an image reading apparatus, an object placed on a table with light and reading an image on or of the object; and measuring, by a range-finding section of the image reading apparatus, a distance between the table and the object. In the reading of the image, the image reading apparatus controls a light emitting portion of a planar light source thereby to control a light collection spot for the planar light source to a position based on a measurement value obtained by the range-finding section.

A method for reading an image according to the present disclosure includes: irradiating, by an image reading apparatus, an object placed on a table with light and reading an image on or of the object; and measuring, by a range-finding section of the image reading apparatus, a distance between the table and the object. In the reading of the image, the image reading apparatus controls a light emitting portion of a planar light source thereby to control a light collection spot for the planar light source to a position based on a measurement value obtained by the range-finding section.

DETAILED DESCRIPTION

Hereinafter, an embodiment of the present disclosure will be described with reference to the accompanying drawings.

Figure 1:
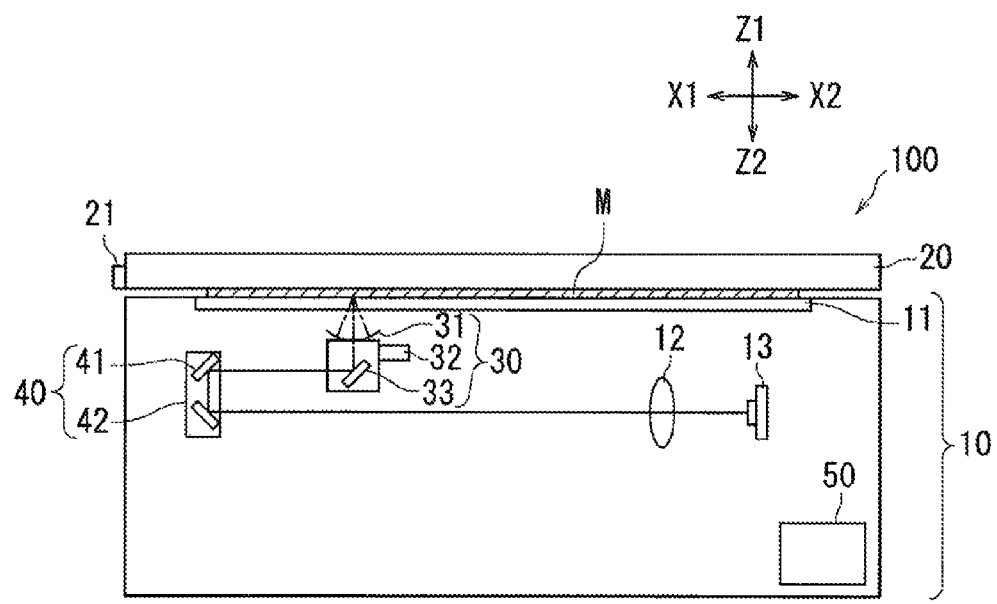
FIG. 1 is a schematic illustration showing an overview of an image reading apparatus according to an embodiment of the present disclosure.

First, a configuration of an image reading apparatus according to the present embodiment will be described with reference mainly to FIG. 1. FIG. 1 is a schematic illustration showing an overview of the image reading apparatus according to the present embodiment.

As shown in FIG. 1, the image reading apparatus of the present embodiment constitutes a scanner 100. The scanner 100 is configured to irradiate an object M (original document) with light and read an image on or of the object M. The scanner 100 includes a main body 10 and a cover 20.

The top surface (e.g., Z1 side) of the main body 10 is provided with a light-transmissive platen 11 (table). The platen 11 is made from glass, for example. In addition, the main body 10 includes carriages 30 and 40, a lens 12, an imaging device 13, and a control section 50. In the present embodiment, the carriage 30 (moving light source) has a light source 31, a range-finding sensor 32 (range-finding section), and a mirror 33.

The object M is set (placed) on the platen 11. The scanner 100 irradiates the object M with light emitted from the light source 31 and reads the image on or of the object M by detecting the light reflected off the object M using the imaging device 13. The light source 31 emits light from below the platen 11 (Z2 side) to the object M. The light emitted passes through the platen 11 and is reflected off a lower surface (surface on the side of the platen 11) of the object M. In the case shown in FIG. 1, the object M is flat (e.g., printing paper).

The cover 20 of the present embodiment is a platen cover openable and closable relative to the platen 11. For reading the image on or of the object M, the cover 20 is opened so that the object M is set on the platen 11, and then the cover 20 is closed so that the image on or of the object M is read. When the object M is flat, the cover 20 can be completely closed as shown in FIG. 1 even with the object M on the platen 11. The cover 20 is provided with an open/closed state sensor 21 that detects an open or closed state of the cover 20.

Figure 2A:
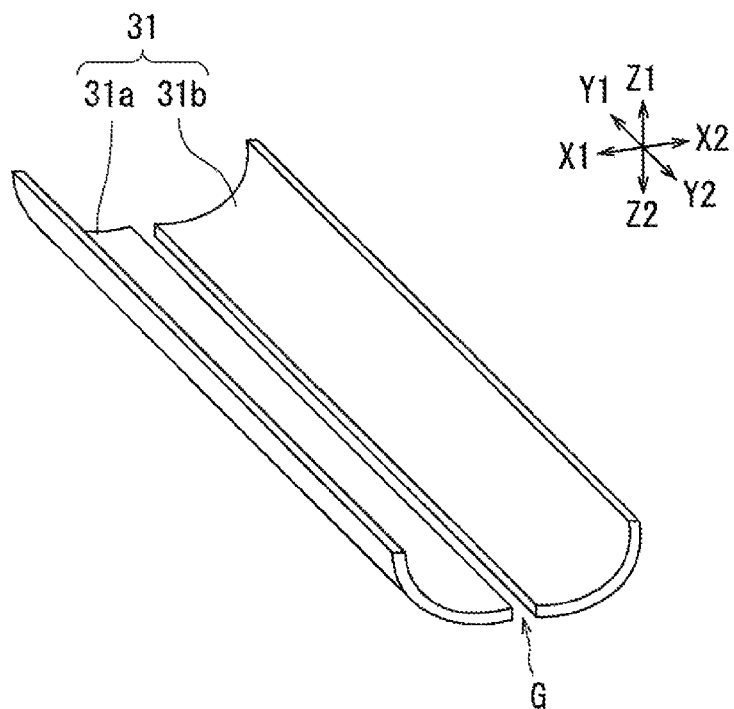
FIG. 2A is a perspective view showing an outer appearance of a light source according to the embodiment of the present disclosure.
Figure 2B:
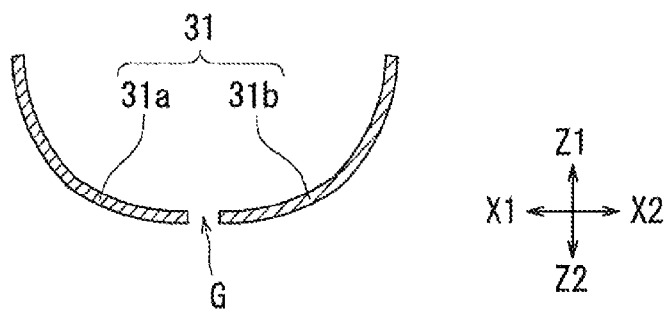
FIG. 2B is a diagram showing a side surface of a shorter side of the light source shown in FIG. 2A.

Subsequently, the configuration of the light source 31 of the present embodiment will be described with reference mainly to FIGS. 2A and 2B. FIG. 2A is a perspective view showing an outer appearance of the light source 31. FIG. 2B is a diagram showing the light source 31 shown in FIG. 2A when the light source 31 is seen from the Y2 side.

As shown in FIGS. 2A and 2B, the light source 31 of the present embodiment includes two sheet-like planar light sources 31a and 31b. In the light source 31, the planar light source 31a and the planar light source 31b face each other via a gap G. Each of the planar light sources 31a and 31b is formed from an organic electroluminescence device (organic EL device), for example. The organic EL device includes a substrate, and a cathode electrode layer, an electron transport layer, a light emitting layer, a hole transport layer, and an anode electrode layer laminated to the substrate, for example. The planar light sources 31a and 31b formed from the organic EL device can be easily bent.

The shapes of the planar light sources 31a and 31b (angle of the curve and the like) are preliminarily adjusted such that light emitted from the light source as a whole when the planar light sources 31a and 31b are caused to entirely emit light can be prevented from being concentrated (collected) on one point. In addition, the shapes of the planar light sources 31a and 31b (angle of the curve and the like) are preliminarily adjusted such that the light collection spot can be controlled to be within a predetermined range by causing the light sources to partially emit light. In the present embodiment, the shape, the arrangement, and so forth of each of the planar light sources 31a and 31b are adjusted such that light emitted by the planar light sources 31a and 31b can be collected on the same spot.

Each of the planar light sources 31a and 31b is formed by bending a rectangular plate having a length in the Y direction and a width in the X direction, for example. The planar light sources 31a and 31b are both elongated in the Y direction, for example. The planar light sources 31a and 31b have the gap G (groove) therebetween elongated in the Y direction, for example. The planar light sources 31a and 31b are bent along their widths. Each of the planar light sources 31a and 31b is in a curve, having a one-quarter cylindrical shape. The light source 31 has a one-half cylindrical shape having the gap G (groove) along the peak of the cylindrical shape. In the present embodiment, the gap G (groove) in the light source 31 is located along the peak of the curve. The light source 31 emits light linear in the Y direction by means of the planar light sources 31a and 31b, for example.

In the present embodiment, the planar light sources 31a and 31b have the same luminescent performance (e.g., light amount). In addition, the planar light sources 31a and 31b have shapes that are symmetrical to each other. Specifically, the planar light sources 31a and 31b are bent so as to draw curves (curved surfaces) symmetrical to each other with respect to the gap G. As shown in FIG. 2B, the planar light sources 31a and 31b have gradual arcuate end surfaces (or cross sectional surfaces) with no sharp bend (tightly bent portion). Thus, the light collection spot can be changed successively (steplessly).

Subsequently, a method for controlling the light collection spot for the light source 31 of the present embodiment will be described with reference mainly to FIGS. 3A to 3C.

In the present embodiment, in principle, the planar light sources 31a and 31b are caused to emit light from portions symmetrical to each other. Thus, the collection spot of the light emitted by the planar light source 31a and the collection spot of the light emitted by the planar light source 31b substantially coincide. For example, when portions R11 and R12 separated (distant) from the gap G of the planar light sources 31a and 31b are selected and caused to emit light as shown in FIG. 3A, the light emitted by the portion R11 and the light emitted by the portion R21 is collected on a spot Q1. For another example, when portions R12 and R22 closer to the gap G of the planar light sources 31a and 31b are selected and caused to emit light as shown in FIG. 3B, the light emitted by the portion R12 and the light emitted by the portion R22 is collected on a spot Q2. For another example, when portions R13 and R23 located in the middle of the planar light sources 31a and 31b are selected and caused to emit light as shown in FIG. 3C, the light emitted by the portion R13 and the light emitted by the portion R23 is collected on a spot Q3.

In the present embodiment, the x-coordinate of the spots Q1, Q2, and Q3 corresponds to the position of the gap G (coincides with the x-coordinate of the gap G). The z-coordinate (level) of the spot Q1 coincides with the z-coordinate of a surface F10 of the platen 11 (a surface on which the object M is placed) as shown in FIG. 3A, for example. The z-coordinate (level) of the spot Q2 is in a position separated from the surface F10 of the platen 11 in the Z1 direction by a distance D11 as shown in FIG. 3B, for example. The z-coordinate (level) of the spot Q3 is in a position separated from the surface F10 of the platen 11 in the Z1 direction by a distance D12 as shown in FIG. 3C, for example. The distance D12 is shorter than the distance D11.

Figure 3A:
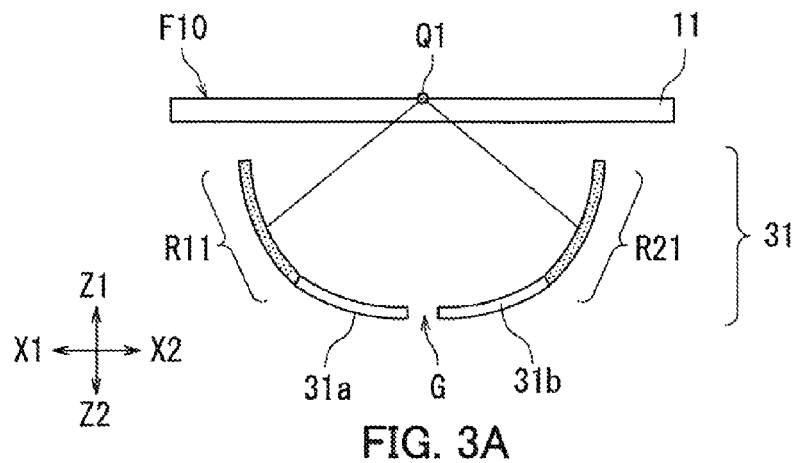
FIG. 3A is a diagram for illustrating an example of a method for controlling a light collection spot according to the embodiment of the present disclosure.
Figure 3B:
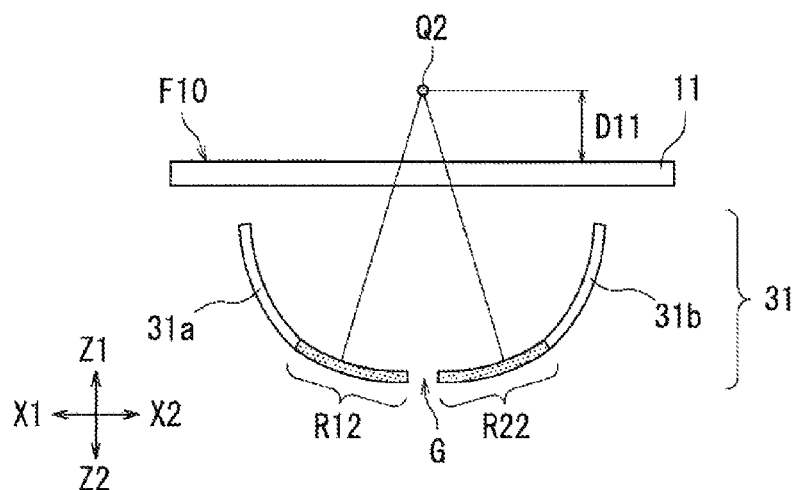
FIG. 3B is a diagram for illustrating an example of the method for controlling the light collection spot according to the embodiment of the present disclosure.
Figure 3C:
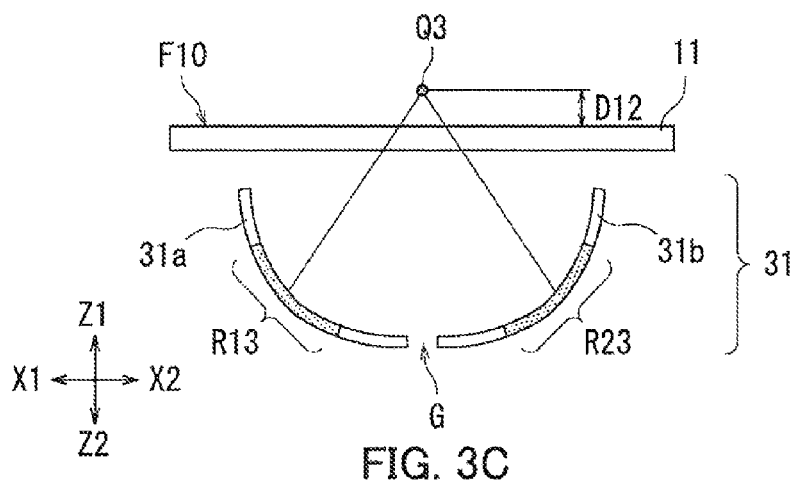
FIG. 3C is a diagram for illustrating an example of the method for controlling the light collection spot according to the embodiment of the present disclosure.

The light emitting portions are not limited to the three types shown in FIGS. 3A to 3C. Any portions of the planar light sources 31a and 31b can be caused to emit light. For example, the more distant from the gap G portions caused to emit light are, the more the light collection spot shifts in the Z2 direction. The closer to the gap G portions caused to emit light are, the more the light collection spot shifts in the Z1 direction. Accordingly, it is possible to collect light on a spot between the spots Q1 and Q3 or on a spot between the spots Q2 and Q3. In the present embodiment, the light collection spot (e.g., the z-coordinate) can be successively (steplessly) changed by controlling the light emitting portions of the planar light sources 31a and 31b.

Next, a method for controlling the amount of light from the light source 31 of the present embodiment will be described with reference mainly to FIGS. 3A to 4C.

In the present embodiment, the control section 50 controls the light amount on the light collection spot by controlling light emitting areas of the planar light sources 31a and 31b. Specifically, when the electric power to the planar light source 31a or 31b (energy input to the planar light source 31a or 31b) is constant, the total light amount of the planar light source 31a or 31b is unchanged. Accordingly, the smaller the light emitting area of the planar light source 31a or 31b is, the more concentrated the energy is. Consequently, the amount of the light emitted per unit area (eventually, the amount of the light on the light collection spot) is larger. In the present embodiment, the control section 50 changes the light emitting areas of the planar light sources 31a and 31b without changing the total light amount of the planar light sources 31a and 31b (electric power to the planar light sources 31a and 31b).

Figure 4A:
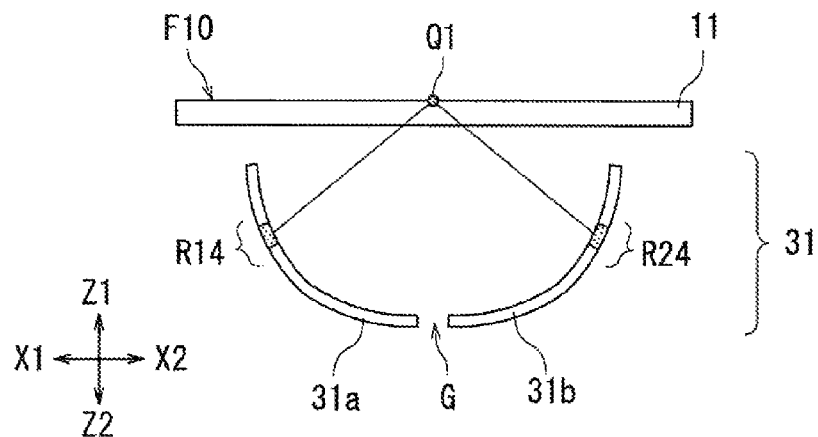
FIG. 4A is a diagram for illustrating an example of a method for controlling the amount of light according to the embodiment of the present disclosure.
Figure 4B:
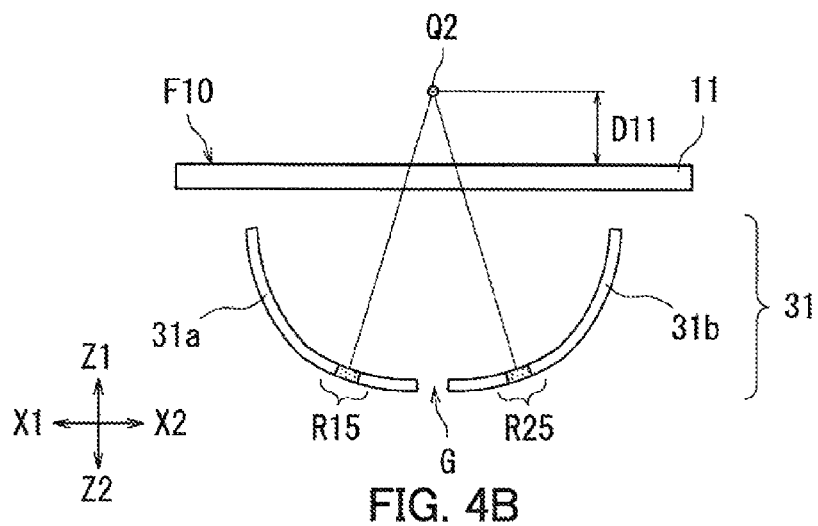
FIG. 4B is a diagram for illustrating an example of the method for controlling the amount of light according to the embodiment of the present disclosure.
Figure 4C:
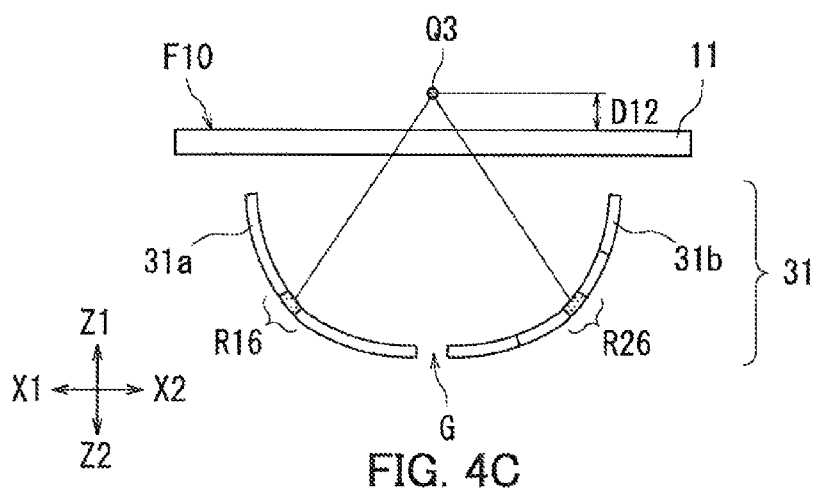
FIG. 4C is a diagram for illustrating an example of the method for controlling the amount of light according to the embodiment of the present disclosure.

For example, portions R14 and R24 having a smaller area than the portions R11 and R21 shown in FIG. 3A may be caused to emit light as shown in FIG. 4A. For another example, portions R15 and R25 having a smaller area than the portions R12 and R22 shown in FIG. 3B may be caused to emit light as shown in FIG. 4B. For another example, portions R16 and R26 having a smaller area than the portions R13 and R23 shown in FIG. 3C may be caused to emit light as shown in FIG. 4C. When the light emitting areas are smaller than those in the case of FIGS. 3A to 3C as shown in FIGS. 4A to 4C, the light amount on the light collection spot is larger than that in the case of FIGS. 3A to 3C. In the present embodiment, the light amount can be changed without changing the light collection spot by changing the light emitting areas as described above.

Subsequently, basic operation of the carriage 30 in image reading will be described with reference mainly to FIGS. 1 and 5. In the present embodiment, the Y direction corresponds to a main scanning direction of the scanner 100, and the X direction corresponds to a sub-scanning direction of the scanner 100.

Figure 5:
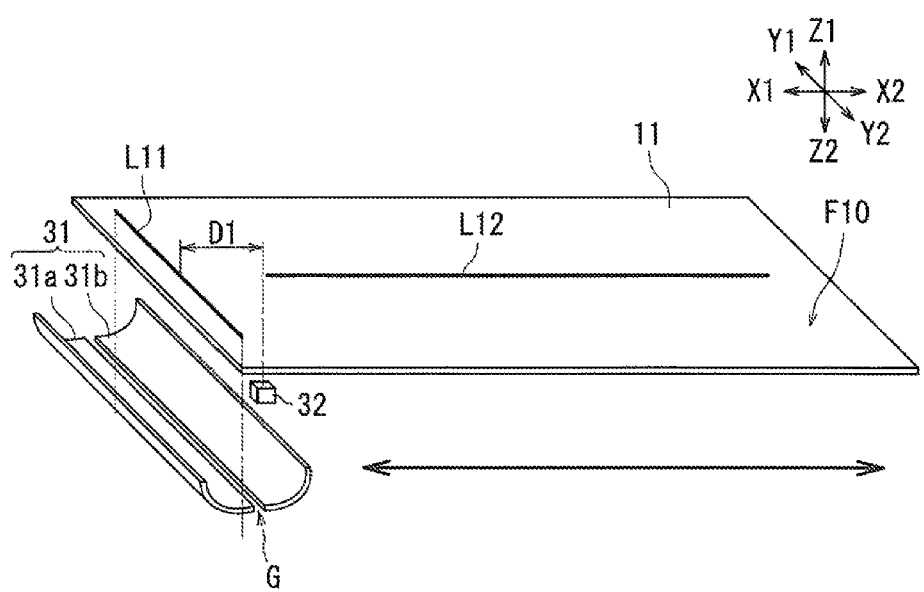
FIG. 5 is a diagram for illustrating basic movement of a carriage in image reading.

The planar light sources 31a and 31b are arranged side by side in the X direction (sub-scanning direction) as shown in FIG. 5. The light source 31 is disposed such that the length thereof is in the Y direction (main scanning direction), for example. The light source 31 emits light linear in the Y direction as represented by a line L11, for example. Accordingly, the light reflected off the object M is also light linear in the Y direction.

In the image reading, the carriage 30 (including the light source 31 and the range-finding sensor 32) moves from a position at the X1 side toward a position at the X2 side, for example. The light source 31 and the range-finding sensor 32 move with the carriage 30 as being fixed to a frame of the carriage 30. The range-finding sensor 32 is disposed on the X2 side of the light source 31, for example. A space D1 between the gap G of the light source 31 and the range-finding sensor 32 is within a range of 1 mm or more and 10 mm or less, for example.

The range-finding sensor 32 emits light to the object using a light source inside thereof and receives the light reflected off the object using a light receiving element inside thereof, for example. The range-finding sensor 32 then converts the light received into a distance and outputs the distance. Any measurement principle may be employed in the range-finding sensor 32, and examples thereof include a triangulation method by which the location of an image formed on the light receiving element is converted into a distance and a time-of-flight method by which a time (time difference) between emission of light and receipt of light is converted into a distance.

The light source 31 moves in the X direction with the movement of the carriage 30 in the X direction. The light source 31 moves in the X direction while emitting light linear in the Y direction. Accordingly, a rectangular area is scanned by the light source 31. In the present embodiment, an approximately whole area of the platen 11 corresponds to the scan area (rectangular area).

With the movement of the carriage 30 in the X direction, the range-finding sensor 32 scans the object M on the platen 11 in the X direction as represented by a line L12. Specifically, the range-finding sensor 32 scans a specified y-coordinate (e.g., the center) of the platen 11 from one end to the other end in the X direction to determine distances to the object M for respective x-coordinates. The range-finding sensor 32 measures the distance between the object M and the range-finding sensor 32. Herein, the distance between the range-finding sensor 32 and the platen 11 is constant. Accordingly, the distance between the object M and the platen 11 (surface F10) can be determined based on the measurement value obtained by the range-finding sensor 32. The measurement value obtained by the range-finding sensor 32 substantially represents the distance between the object M and the platen 11 (surface F10).

The description will be continued with reference to FIG. 1. The carriage 40 has a mirror 41 and a mirror 42. The light reflected off the object M is further reflected off the mirror 33, the mirror 41, and the mirror 42 in sequence, and then guided toward the lens 12. Thereafter, the light passes through the lens 12 to reach the imaging device 13. Thus, the light reflected off the object M is detected by the imaging device 13. In the image reading, the carriage 40 moves in response to the movement of the carriage 30 in order to keep the length of an optical path from the light source 31 to the imaging device 13 constant.

The imaging device 13 includes a charge coupled device (CCD) image sensor, an analog-digital (A/D) converter, for example. The imaging device 13 generates an analog electric signal based on the light received by the CCD image sensor and converts the analog electric signal into a digital electric signal using the A/D converter, for example. The imaging device 13 outputs the digital electric signal. The imaging device 13 may have any configuration. For example, the imaging device 13 may include a complementary metal oxide semiconductor (CMOS) image sensor.

Figure 6:
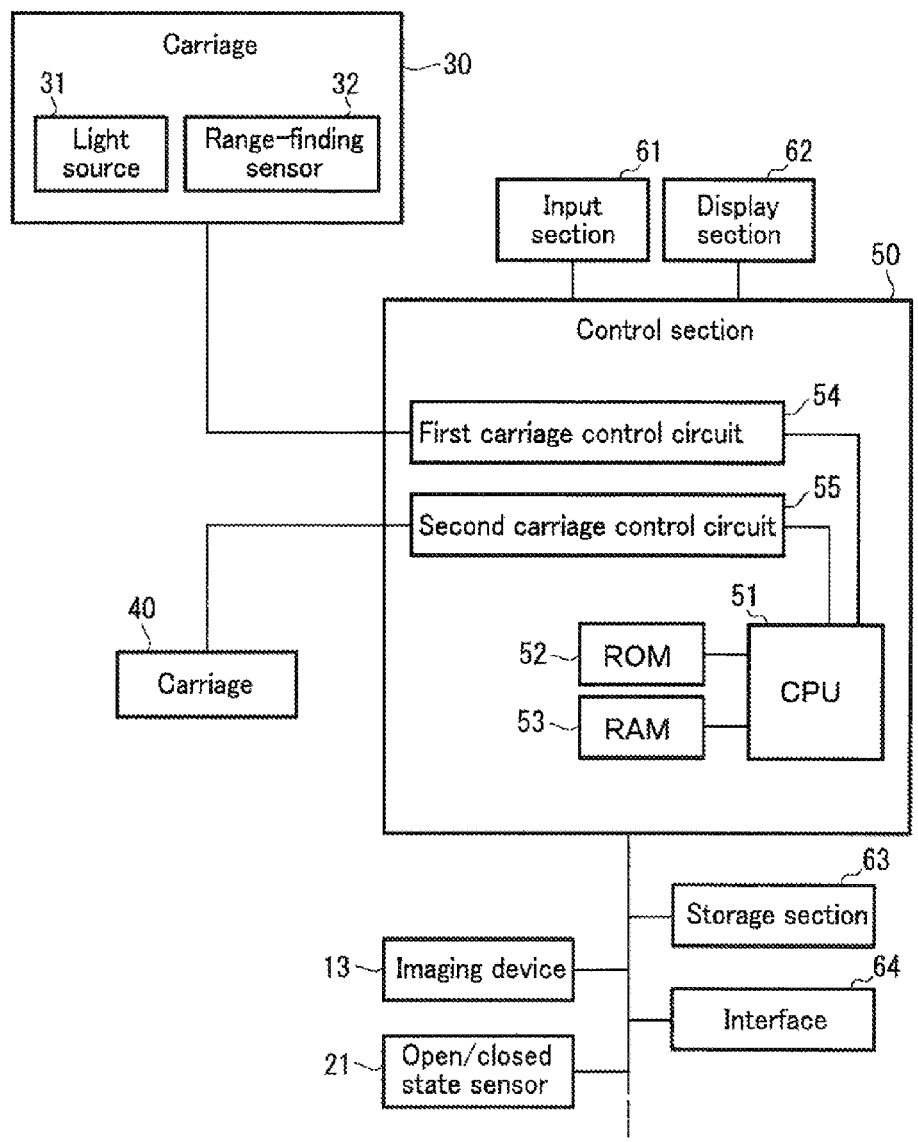
FIG. 6 is a block diagram showing, on a function-by-function basis, the configuration of a control section of the image reading apparatus according to the embodiment of the present disclosure.

Subsequently, the configuration of the control section 50 will be described with reference mainly to FIG. 6. FIG. 6 is a block diagram showing the configuration of the control section 50 on a function-by-function basis.

As shown in FIG. 6, the control section 50 has a central processing unit (CPU) 51, a read only memory (ROM) 52, a random access memory (RAM) 53, a first carriage control circuit 54, and a second carriage control circuit 55.

Signals output from the open/closed state sensor 21, signals output from the imaging device 13, and so forth are input into the control section 50. The control section 50 controls the carriage 30, the carriage 40, and so forth based on the different types of signals.

The ROM 52 includes a programmable ROM (PROM) such as a flash memory, for example. The ROM 52 stores therein a basic input/output system (BIOS), an operating system (OS), various drivers, and programs such as various applications, for example. The RAM 53 includes a dynamic RAM (DRAM), for example.

The CPU 51 receives from the carriage 30 signals output by the range-finding sensor 32. The CPU 51 controls the carriage 30 (a motor for moving the carriage 30, the light source 31, the range-finding sensor 32, and so forth) through the first carriage control circuit 54. The CPU 51 can cause any portions of the planar light sources 31a and 31b to emit light. The CPU 51 can control the total light amount of the planar light sources 31a and 31b by controlling the electric power supplied from a power source, not shown, to the planar light sources 31a and 31b (energy input to the planar light sources 31a and 31b). Preferably, the electric power to the planar light sources 31a and 31b is controlled by analog modulation, for example. The electric power can be controlled to an appropriate level depending on changes in conditions more readily by the analog modulation than by pulse-width modulation (PWM).

The CPU 51 controls the carriage 40 (e.g., a motor for moving the carriage 40) through the second carriage control circuit 55.

The control section 50 is connected communicatively with each of an input section 61, a display section 62, a storage section 63, and an interface 64.

The input section 61 receives input by a user. The input section 61 includes a keyboard, a mouse, a touch panel, or the like. The display section 62 includes a display such as a liquid crystal display (LCD) or an electro luminescence display (ELD), for example. When including a touch panel, the input section 61 and the display section 62 are integrated.

The storage section 63 includes a non-volatile memory such as a hard disk, for example. The storage section 63 stores therein image data for printing, programs relating to various types of control, data to be used in the programs, measurement values obtained by the range-finding sensor 32, and so forth.

The interface 64 enables transmission and receipt of data between the control section 50 and an external device. The control section 50 is connected to a general-purpose computer (i.e., personal computer) or the like via the interface 64.

Subsequently, a method for reading an image using the scanner 100 of the present embodiment will be described. In the present embodiment, different image reading methods are employed for the case where the object M is flat, for the case where the object M is tridimensional, and for the case where the object M is shiny. In the present embodiment, the control section 50 determines whether or not the object M is tridimensional (or flat) based on output from the open/closed state sensor 21 (opening or closed state of the cover 20) in image reading. In the present embodiment, in addition, the control section 50 determines whether or not the object M is shiny based on input by a user (input through the input section 61).

Hereinafter, an image reading method for the case where the object M is flat will be described with reference mainly to FIG. 7.

Figure 7:
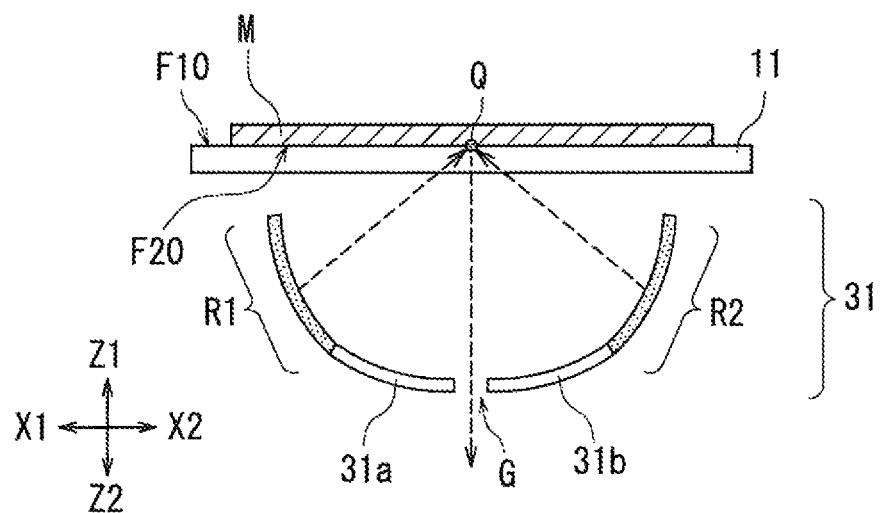
FIG. 7 is a diagram showing a form of image reading when an object is flat in an image reading method according to the embodiment of the present disclosure.

When the open/closed state sensor 21 detects that the cover 20 is completely closed (see FIG. 1) in image reading, for example, the control section 50 determines that the object M is flat, and the image reading is performed as in a form shown in FIG. 7. As shown in FIG. 7, a to-be-read surface (surface F20) of the object M is entirely in contact with the surface F10 of the platen 11 when the object M is flat (e.g., paper).

Since the distance between the light source 31 and the object M is constant when the object M is flat as shown in FIG. 7, the light collection spot Q for the light source 31 (specifically, relative positions of the light source 31 and the light collection spot Q) does not need to be changed. When an image on a flat object (object M) is read, therefore, the light emitting portions of the light source 31 are not changed to perform the scan.

In the present embodiment, the light emitting portion R1 of the planar light source 31a and the light emitting portion R2 of the planar light source 31b are portions separated (distant) from the gap G. In this case, the x-coordinate of the light collection spot Q substantially coincides with the x-coordinate of the gap G, and the z-coordinate of the light collection spot Q substantially coincides with the z-coordinate of the surface F10 of the platen 11 (surface F20 of the object M). The light reflected off the object M passes through the gap G, is reflected off the mirror 33, the mirror 41, and the mirror 42 in sequence, passes through the lens 12, and is detected by the imaging device 13 (see FIG. 1).

Since the distance between the light source 31 and the object M is constant when the object M is determined to be flat, it is assumed that there is no need to measure the distance using the range-finding sensor 32. In the present embodiment, therefore, the range-finding sensor 32 is not activated when the object M is determined to be flat. Thus, the power consumption can be reduced, or the throughput can be increased (scan time can be reduced).

Hereinafter, an image reading method for the case where the object M is tridimensional will be described with reference mainly to FIGS. 8A, 9A to 9C, and 10.

Figure 8A:
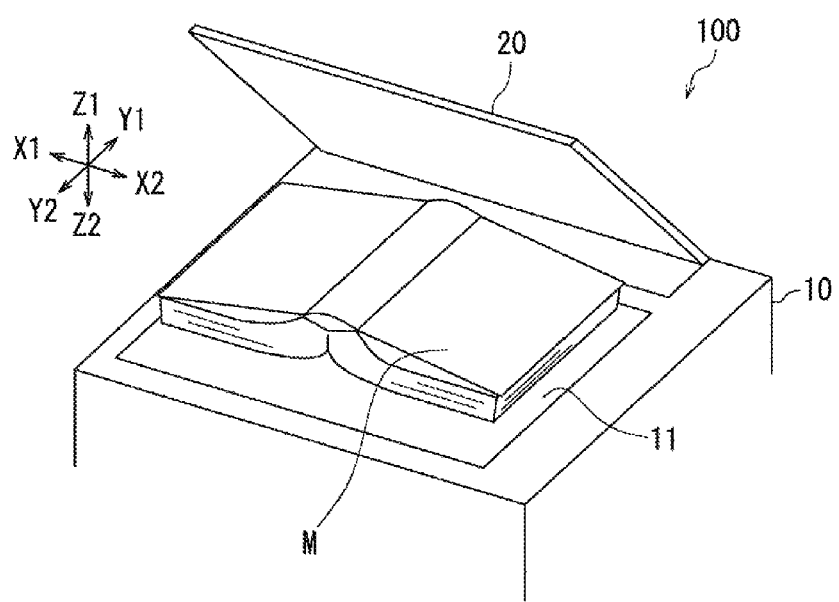
FIG. 8A is a diagram showing an open/closed state of a cover (platen cover) when the object is tridimensional in the image reading method according to the embodiment of the present disclosure.
Figure 8B:
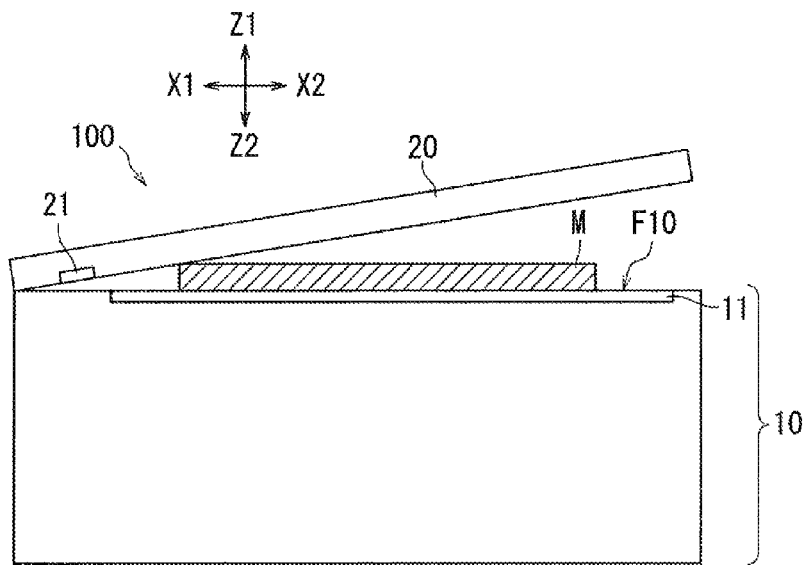
FIG. 8B is a diagram showing an open/closed state of the cover (platen cover) when the object is tridimensional in the image reading method according to the embodiment of the present disclosure.

When the object M is a book (original document in a book) as shown in FIG. 8A, the cover 20 cannot be closed as shown in FIG. 8B. When the open/closed state sensor 21 detects that the cover 20 is not completely closed (is open) in image reading in the present embodiment, therefore, the control section 50 determines that the object M is tridimensional, and the image reading is performed as in a form shown in FIGS. 9A to 9C and 10, for example. As shown in FIGS. 9A to 9C and 10, a part of the to-be-read surface (surface F20) of the object M may not be in contact with the surface F10 of the platen 11 when the object M is tridimensional. For example, a bound portion (gutter) of the object M (book) is out of contact with the platen 11.

When the object M is determined to be tridimensional in the present embodiment, the control section 50 activates the range-finding sensor 32 and controls the light collection spot for the light source 31 based on the measurement value obtained by the range-finding sensor 32.

Figure 9A:
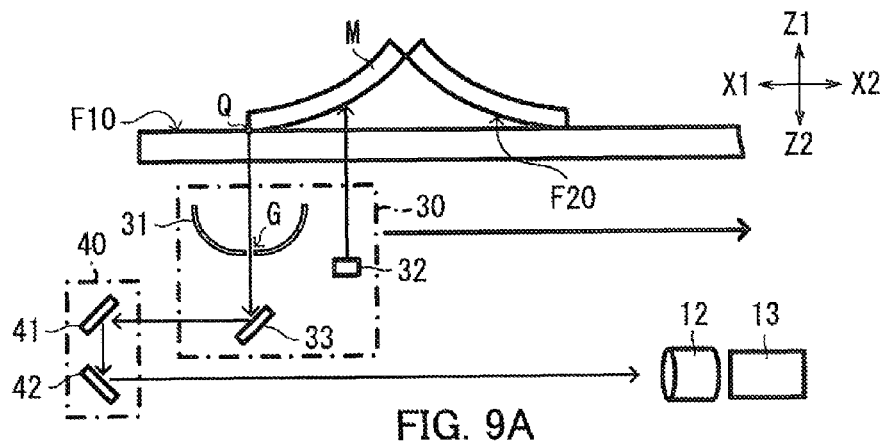
FIG. 9A is a diagram showing a form of scan in image reading when the object is tridimensional in the image reading method according to the embodiment of the present disclosure.
Figure 9B:
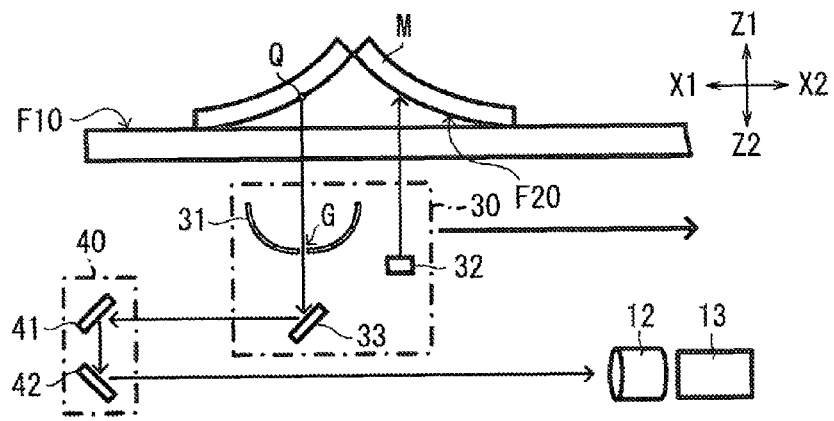
FIG. 9B is a diagram showing a form of scan in image reading when the object is tridimensional in the image reading method according to the embodiment of the present disclosure.
Figure 9C:
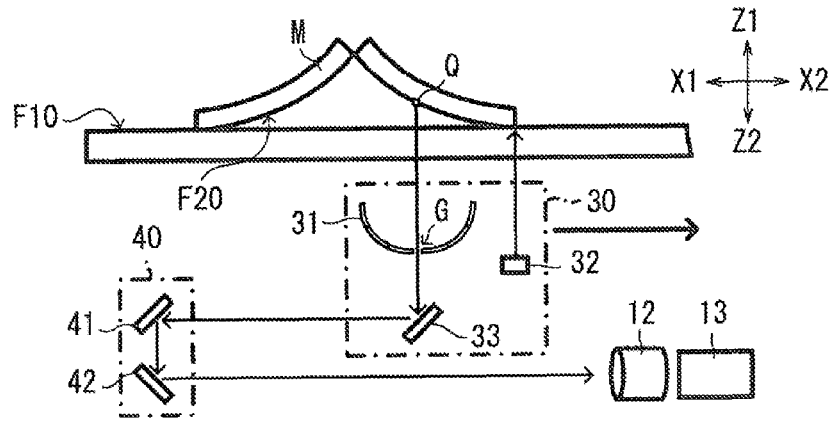
FIG. 9C is a diagram showing a form of scan in image reading when the object is tridimensional in the image reading method according to the embodiment of the present disclosure.

When an image on or of the tridimensional object (object M) is read, the carriage 30 moves toward the X2 side from a position shown in FIG. 9A through a position shown in FIG. 9B to a position shown in FIG. 9C, for example. In response to the movement of the carriage 30, the carriage 40 also moves to keep the length of an optical path from the light source 31 to the imaging device 13 constant.

The carriage 30 measures the distance to the object M (surface F20) by means of the range-finding sensor 32 while moving. The control section 50 acquires the measurement value obtained by the range-finding sensor 32 as needed and stores the measurement value in the storage section 63, for example. The carriage 30 emits light to the object M by means of the light source 31 while moving. The light reflected off the object M passes through the gap G is reflected off the mirror 33, the mirror 41, and the mirror 42 in sequence, passes through the lens 12, and is detected by the imaging device 13.

In the image reading, the control section 50 controls the light collection spot Q for the light source 31 to a position (z-coordinate) based on the measurement value obtained by the range-finding sensor 32. For example, for controlling the light collection spot Q, the control section 50 changes the light emitting portions of the light source 31 and thus changes the light collection spot Q for the light source 31 (see FIGS. 3A-3C). In the present embodiment, the control section 50 causes portions closer to the peak of the curve (gap G) of the light source 31 to emit light for a longer distance measured by the range-finding sensor 32. The control section 50 causes portions closer to the middle (closer to the gap G) of the light source 31 to emit light for a light collection spot Q (surface F20) at a higher level (more distant from the surface F10). The control section 50 causes portions closer to the side edges (more distant from the gap G) of the light source 31 to emit light for a light collection spot Q (surface F20) at a lower level (closer to the surface F10).

When the object M is tridimensional, it is expected that the light is dispersed because of scattered reflection on the object M, and only a small fraction of the scattered light enters the imaging device 13. In the present embodiment, therefore, the amount of light to emit to the object M (light amount on the light collection spot) is controlled to be larger in the case of the tridimensional object M than in the case of the flat object M. Thus, a sufficient amount of the reflected light can enter the imaging device 13 even when the to-be-read surface (surface F20) of the object M is curved. In the present embodiment, the control section 50 controls the light amount on the light collection spot (amount of light to emit to the object M) by changing the light emitting areas of the planar light sources 31a and 31b without changing the electric power to the planar light sources 31a and 31b (eventually, the total light amount of the planar light sources 31a and 31b) (see FIGS. 3A to 4C). However, the present disclosure is not limited to the embodiment. For example, the light amount may be controlled to be larger in the case of the tridimensional object M than in the case of the flat object M by increasing the electric power to the planar light sources 31a and 31b.

Figure 10:
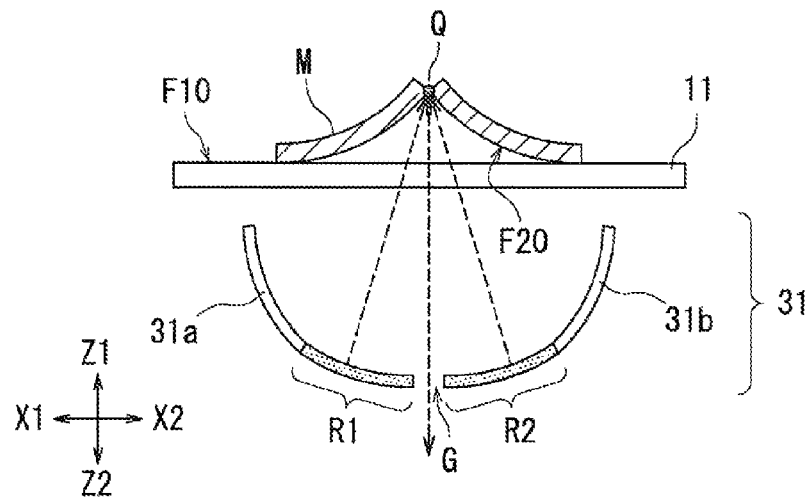
FIG. 10 is a diagram showing a form of image reading when the object is tridimensional in the image reading method according to the embodiment of the present disclosure.

When the bound portion of the object M (book) is irradiated with light, image reading is performed as in a form shown in FIG. 10, for example. In the present embodiment, the light emitting portion R1 of the planar light source 31a and the light emitting portion R2 of the planar light source 31b are portions closer to the gap G. In this case, the x-coordinate of the light collection spot Q substantially coincides with the x-coordinate of the gap G, and the light collection spot Q agrees with the position of the bound portion of the object M.

Hereinafter, an image reading method for the case where the object M is shiny will be described with reference mainly to FIG. 11. Specifically, the case where the object M is tridimensional and shiny (e.g., jewel) will be described.

When a user inputs that the object M is shiny through the input section 61 (e.g., such a mode is selected) prior to image reading, the control section 50 determines that the object M is shiny. When the open/closed state sensor 21 detects that the cover 20 is not completely closed, the control section 50 determines that the object M is tridimensional.

Figure 11:
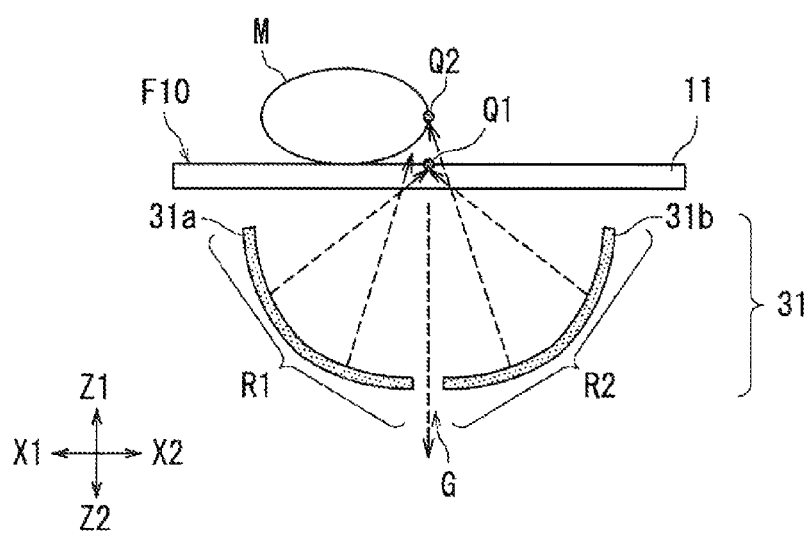
FIG. 11 is a diagram showing a form of image reading when the object is shiny in the image reading method according to the embodiment of the present disclosure.

For reading an image on or of a tridimensional and shiny object (object M), the planar light sources 31a and 31b are caused to entirely emit light as shown in FIG. 11, for example. In this case, preferably, the electric power to the planar light sources 31a and 31b (eventually, the total light amount of the planar light sources 31a and 31b) is set equal to that in the case of the object M that is not shiny (the case where the planar light sources 31a and 31b are caused to partly emit light). Thus, the amount of light emitted per unit area is smaller in this case than in the case where the planar light sources 31a and 31b are caused to partly emit light. As a result, the light amount on the light collection spot is smaller.

The light emitted by the entire planar light sources 31a and 31b is not concentrated (collected) on one point. Specifically, the light is dispersed to be collected on the spot Q1 at the same level as the surface F10 of the platen 11 and on the spot Q2 at a higher level than the surface F10 of the platen 11 as shown in FIG. 11, for example. As a result, the light amount on each light collection spot is smaller.

In the present embodiment, the amount of light to emit to the object M (the light amount on each light collection spot) is reduced for reading the image of the shiny object (object M). Thus, the possibility that an excessive amount of light enters the imaging device 13 in case of specular reflection due to the shininess of the object M can be reduced. As a result, the accuracy of the image reading can be increased.

For the above-described control, the planar light sources 31a and 31b are caused to entirely emit light, and therefore the range-finding sensor 32 is not activated. Thus, the power consumption can be reduced, or the throughput can be increased (scan time can be reduced).

In the present embodiment, the light amount on each light collection spot is reduced by causing the planar light sources 31a and 31b to entirely emit light. However, the present disclosure is not limited to the embodiment. For example, the light amount may be controlled to be smaller in the case of the shiny object M than in the case of the object M that is not shiny by reducing the electric power to the planar light sources 31a and 31b.

In the present embodiment, the light amount on the light collection spot in the case of the flat object M is controlled to be 70%, for example, and the light amount on each light collection spot in the case of the shiny object M is controlled to be 20%, for example, on the assumption that the light amount on the light collection spot in the case of the tridimensional object M is 100%. The present disclosure is not limited to the embodiment, and the light amount in each case can be set to any value.

In the present embodiment, the image reading method by the entire light emission as shown in FIG. 11 (hereinafter, referred to as shiny object mode) is employed in preference to the image reading method by the partial light emission as shown in FIGS. 9A to 9C and 10 (hereinafter, referred to as tridimensional object mode). Accordingly, the image of the tridimensional and shiny object M is read in the shiny object mode. However, the present disclosure is not limited to the embodiment, and the image of the tridimensional and shiny object M may be read in the tridimensional object mode. However, it is preferable that the light amount is controlled to be smaller in the case of the shiny object M than in the case of the object M that is not shiny by reducing the electric power to the planar light sources 31a and 31b.

The scanner 100 according to the present embodiment described so far can produce the following excellent effect.

In the scanner 100 of the present embodiment, a control section (e.g., control section 50) controls light emitting portions of the planar light sources 31a and 31b thereby to control the light collection spot for the planar light sources 31a and 31b to a position based on the measurement value obtained by the range-finding sensor 32. Since the light collection spot is controlled by controlling the light emitting portions of the planar light sources 31a and 31b, it is possible to appropriately control the light collection spot without the need of adding a mechanical component such as a motor. Since the light collection spot is controlled based on the measurement value obtained by the range-finding sensor 32, in addition, it is possible to appropriately read the image (e.g., density) on or of the object M even when the object M has a complicated shape. As a result, it is possible to read images on or of objects in various shapes (e.g., a flat object and a tridimensional object) correspondingly with high accuracy.

The control section (e.g., control section 50) of the scanner 100 according to the present embodiment controls the light amount on the light collection spot by controlling the light emitting areas of the planar light sources 31a and 31b. Specifically, the control section (e.g., control section 50) of the scanner 100 changes the light emitting areas of the planar light sources 31a and 31b without changing the total light amount of the planar light sources 31a and 31b. The light amount can be controlled readily or accurately since it is controlled by controlling the light emitting areas. In addition, by causing the planar light sources 31a and 31b to partially emit light, the light amount can be increased without the need of increasing the electric power. Thus, the power consumption can be reduced. The light amount on the light collection spot may be controlled by controlling both the electric power to and the light emitting areas of the planar light sources 31a and 31b.

The control section (e.g., control section 50) of the scanner 100 according to the present embodiment causes portions closer to the peak of the curve of the light source 31 for a larger distance measured by the range-finding sensor 32. Thus, the light collection spot can be controlled readily or accurately.

The control section (e.g., control section 50) of the scanner 100 according to the present embodiment determines whether or not the object M is tridimensional. The control section controls the planar light sources 31a and 31b by referring to the measurement value obtained by the range-finding sensor 32 when it determines that the object M is tridimensional. The control section controls the planar light sources 31a and 31b without referring to the measurement value obtained by the range-finding sensor 32 when it determines that the object M is not tridimensional. With such a configuration, the range-finding sensor 32 is not activated when it is determined that the object M is not tridimensional. Thus, the power consumption can be reduced, or the throughput can be increased (scan time can be reduced).

The control section (e.g., control section 50) of the scanner 100 according to the present embodiment determines whether or not the object M is tridimensional. The control section controls the amount of light to emit to the object M (light amount on the light collection spot) so that it is larger when the control section determines that the object M is tridimensional than when the control section determines that the object M is not tridimensional. With such a configuration, a sufficient amount of reflected light can enter the imaging device 13 even if the light emitted is scattered on the tridimensional object (object M). As a result, the accuracy of the image reading can be increased.

The control section (e.g., control section 50) of the scanner 100 according to the present embodiment determines whether or not the object M is tridimensional based on the open or closed state of the cover 20. With such a configuration, it is possible to readily detect whether or not the object M is tridimensional.

The control section (e.g., control section 50) of the scanner 100 according to the present embodiment determines whether or not the object M is shiny. The control section causes the planar light sources 31a and 31b to entirely emit light when it determines that the object M is shiny. The amount of light to emit to the object M can be controlled to be smaller when the planar light sources 31a and 31b are caused to entirely emit light than when the planar light sources 31a and 31b are caused to partially emit light. In this case, the amount of light to emit to the object M can be reduced more reliably by ensuring that the total light amount when the planar light sources 31a and 31 b are caused to entirely emit light is equal to the total light amount when the planar light sources 31a and 31b are caused to partially emit light. The case of the shiny object M involves a concern that specular reflection may occur due to the shininess of the object M and an excessive amount of light may enter the imaging device 13. In view of such a concern, in the present embodiment, the light amount on the light collection spot (amount of light to emit to the object M) is controlled to be smaller. Thus, the possibility that an excessive amount of light enters the imaging device 13 can be reduced. As a result, the accuracy of the image reading can be increased.

The control section (e.g., control section 50) of the scanner 100 according to the present embodiment determines whether or not the object M is shiny based on input by a user. Thus, whether or not the object M is shiny can be readily detected.

The control section 50 by itself may achieve the above-described control, or the control section 50 may cooperate with a program, a circuit, or the like provided outside the control section 50 to achieve the above-described control.

Each of the planar light sources 31a and 31b of the scanner 100 according to the present embodiment is formed from an organic electroluminescence device. Such planar light sources 31a and 31b have excellent optical properties, and can be easily bent into a desired shape.

The present disclosure is not limited to the above-described embodiment. For example, the following variations are possible to practice the present disclosure.

In the above-described embodiment, the electric power to the planar light sources 31a and 31b (eventually, the total light amount of the planar light sources 31a and 31b) in the case of the shiny object M (the case where the planar light sources 31a and 31 b are caused to entirely emit light) is equal to the electric power to the planar light sources 31a and 31b (eventually, the total light amount of the planar light sources 31a and 31b) in the case of the object M that is not shiny (the case where the planar light sources 31a and 31b are caused to partially emit light). However, the present disclosure is not limited to the embodiment. The electric power to the planar light sources 31a and 31b in the case of the shiny object M may be larger or smaller than the electric power to the planar light sources 31a and 31b in the case of the object M that is not shiny. The possibility that an excessive amount of light enters the imaging device 13 can be prevented more reliably as long as the total light amount when the planar light sources 31a and 31b are caused to entirely emit light is smaller than the total light amount when the planar light sources 31a and 31b are caused to partially emit light.

In the above-described embodiment, the planar light sources 31a and 31b are caused to entirely emit light when the object M is shiny. However, the present disclosure is not limited to the embodiment. The planar light sources 31a and 31b may be caused to partially emit light when the object M is shiny.

In the above-described embodiment, whether or not the object M is tridimensional is determined based on the open or closed state of the cover 20. However, the present disclosure is not limited to the embodiment. For example, whether or not the object M is tridimensional may be determined based on light emitted to and reflected off the object M. For example, the light source 31 may emit light to the object M as pre-scan while going (moving toward the X2 side in FIG. 5, for example) for determining whether or not the object M is tridimensional and re-emit light to the object M as main scan while returning (moving toward the X1 side in FIG. 5, for example) for reading the image on or of the object M. Alternatively, whether or not the object M is tridimensional may be determined based on input by a user.

In the above-described embodiment, whether or not the object M is shiny is determined based on input by a user. However, the present disclosure is not limited to the embodiment. For example, whether or not the object M is shiny may be determined based on light emitted to and reflected off the object M (e.g., reflectance). For example, the light source 31 may emit light to the object M as pre-scan while going (moving toward the X2 side in FIG. 5, for example) for determining whether or not the object M is shiny and re-emit light to the object M as main scan while returning (moving toward the X1 side in FIG. 5, for example) for reading the image on or of the object M.

Figure 12A:
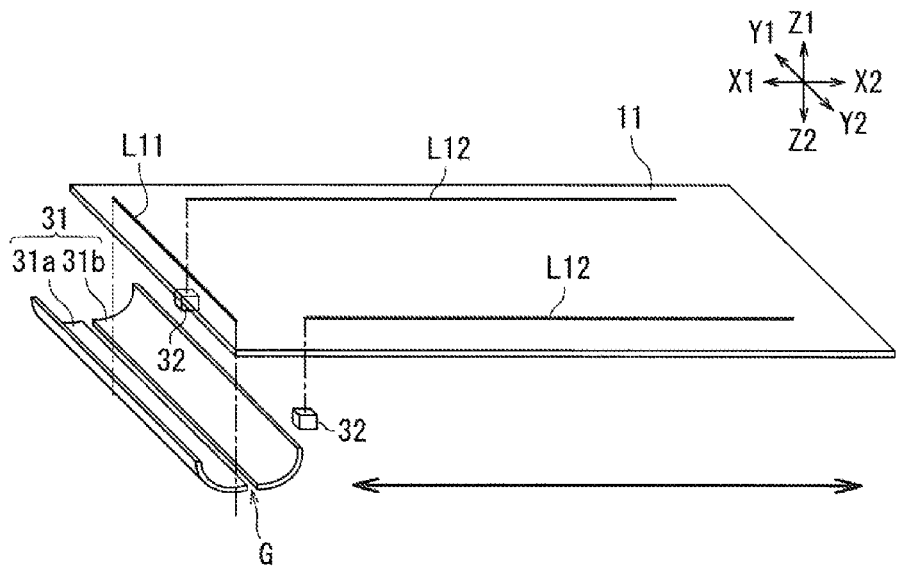
FIG. 12A is a diagram showing a case according to another embodiment of the present disclosure where the carriage (moving light source) includes a plurality of range-finding sensors.

In the above-described embodiment, the scanner includes one range-finding sensor 32 for the measurement of the distance between the platen 11 and the object M. However, the present disclosure is not limited to the embodiment. The number of the range-finding sensors 32 is optional. For example, the scanner 100 may include two range-finding sensors 32 as shown in FIG. 12A.

It is desirable to include a plurality of range-finding sensors 32 considering that an image on or of a tridimensional object having a more complicated shape than a book may be read and that how to place the object M (e.g., position or orientation of the object M on the platen 11) may vary. It is expected that the more range-finding sensors 32 the scanner 100 includes, the more accurately the shape or the state of the object M can be grasped, increasing the accuracy of the image reading. In terms of cost, however, it is advantageous that the scanner 100 includes fewer range-finding sensors 32.

Figure 12B:
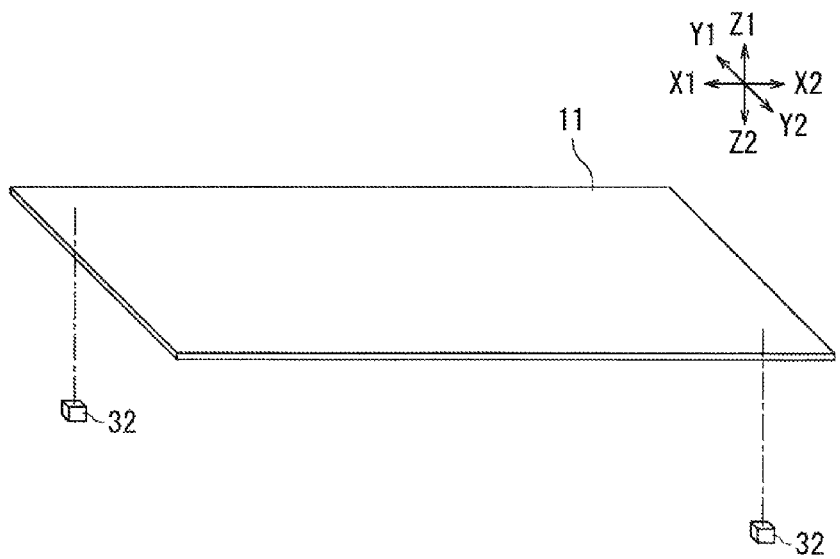
FIG. 12B is a diagram showing a case according to yet another embodiment of the present disclosure where range-finding sensors are fixed.

In the embodiment, the carriage 30 (moving light source) includes the range-finding sensor 32. Accordingly, the range-finding sensor 32 moves with the light source 31 in image reading. However, the present disclosure is not limited to the embodiment. The range-finding sensor 32 may be configured to be stationary. For example, the range-finding sensor 32 may be off the carriage 30 and fixed to a frame of the scanner 100. Preferably, a plurality of fixed range-finding sensors 32 are disposed at opposing corners of the platen 11 as shown in FIG. 12B, for example. With such an arrangement, the shape or the state of the object M can be accurately grasped with fewer range-finding sensors 32.

The range-finding sensor 32 may be used for a purpose other than the purpose of measuring the distance between the platen 11 and the object M. For example, the range-finding sensor 32 may be used for determining whether or not the object M is tridimensional or shiny (e.g., the above-mentioned pre-scan). Furthermore, the range-finding sensor 32 may be used for detecting the size of the object M (e.g., size of paper).

In the present embodiment, the planar light sources 31a and 31b have shapes symmetrical to each other. However, the present disclosure is not limited to the embodiment. The planar light sources 31a and 31b may have shapes asymmetrical to each other. The light emitting portion of the planar light source 31a and the light emitting portion of the planar light source 31b do not need to be in positions symmetrical to each other, and portions in positions asymmetrical to each other of the planar light sources 31a and 31b may be caused to emit light. Desirably, the light source may be controlled as appropriate depending on the use or the situation.

In the embodiment, the light source 31 includes two planar light sources 31a and 31b. However, the present disclosure is not limited to the embodiment. A light source including one planar light source may be used. For example, the reflected light can be detected even if the light source 31 (see FIG. 2A, for example) does not have the gap G and the planar light sources 31a and 31b are integrated as long as at least a portion of the light source 31 corresponding to the gap G is light-transmissive. Alternatively, the light source 31 (see FIG. 2A, for example) may include three or more planar light sources obtained by dividing the planar light source 31a and/or the planar light source 31b, for example.

The form of the curve of the light source 31 may be automatically controlled by an additional mechanism. The light amount, the light emitting portions, or the light collection spot, for example, may be adjusted by such automatic control. Furthermore, a different type of planar light source than the organic EL device may be used.

In the above-described embodiment, the configuration of the scanner 100 (components, dimension, material, shape, arrangement, or the like) may be optionally altered or omitted within the scope not departing from the gist of the present disclosure.

The functions relating to the control of the scanner 100 according to the above-described embodiment can be achieved by hardware (e.g., electronic circuit) or by software (program). In the above-described embodiment, a program to be executed by the control section 50 may be distributable, stored in a computer-readable storage medium such as a CD-ROM. Alternatively, the program may be retained in a specified server device on a communication network so that a client can execute or download the program therefrom. In the case where a specified function is achieved by cooperation of an operation system (OS) and an application, only non-OS programs may be made distributable.

Figure 13:
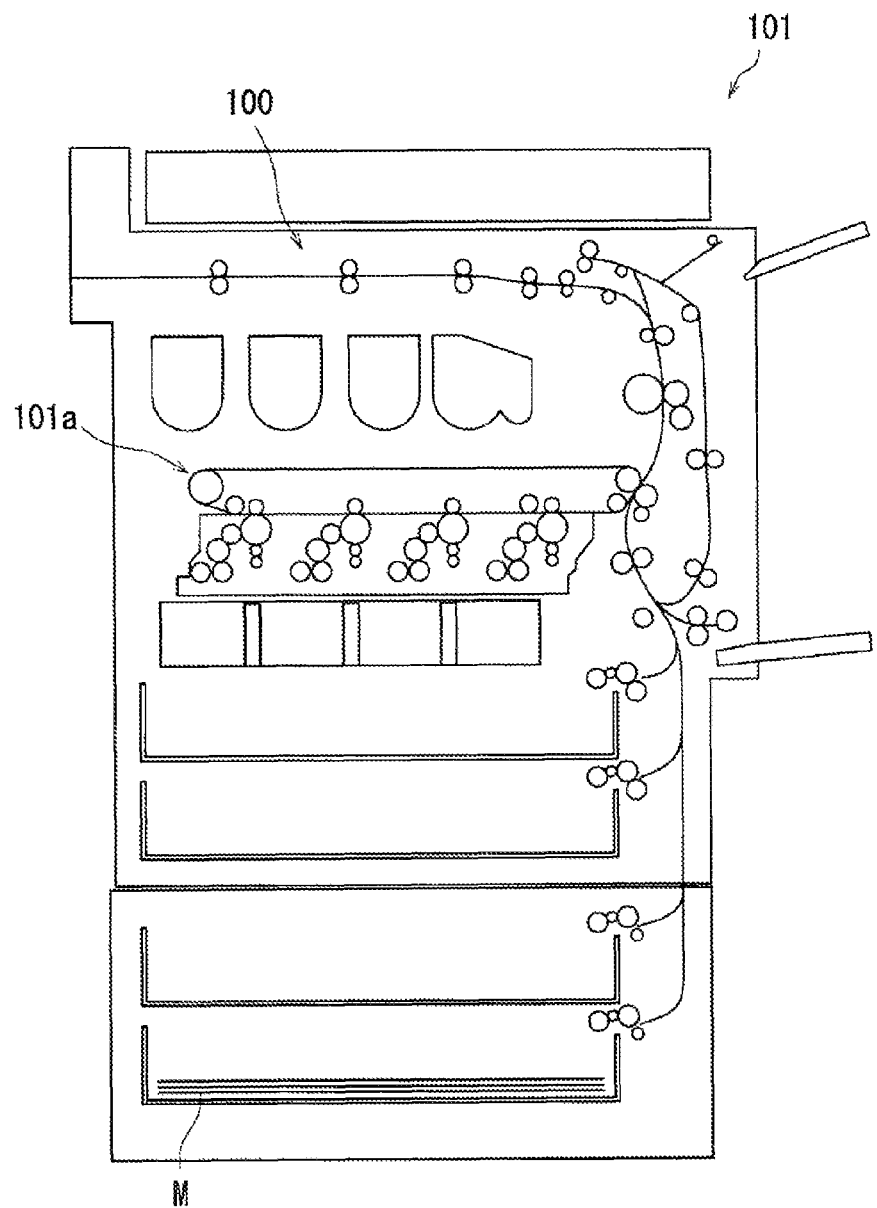
FIG. 13 is a schematic view showing an image forming apparatus according to the embodiment of the present disclosure.

The scanner 100 (image reading apparatus) according to the above-described embodiment may be incorporated in an image forming apparatus so that an image can be formed based on data of the image read by the scanner 100. For example, the scanner 100 may be incorporated in an image forming apparatus to form a copier. Furthermore, as shown in FIG. 13, the scanner 100 may be incorporated in a multifunction peripheral 101 (multifunctional image forming apparatus) having functions of scanner, copier, printer, and facsimile machine, for example. The multifunction peripheral 101 includes an image forming section 101a that forms an image with toner, for example.

The above-described embodiment and variations may be combined in any way. Preferably, an appropriate combination is selected depending on the use and so forth.

What is claimed is:

1. An image reading apparatus that irradiates an object with light and reads an image on or of the object, comprising:
    a table having a flat surface on which the object is placed;
    a light source including an inner surface having a curved shape and being configured to emit the light from at least a light emitting portion to the object on the flat surface of the table, the light emitting portion being a portion of the inner surface, the curved shape allowing a location of the light emitting portion to be changed within the inner surface along the curved shape so that a light collection spot of the light shifts along a direction perpendicular to the flat surface of the table;
    an imaging device configured to detect light reflected off the object;
    a range-finding section configured to measure a distance between the flat surface of the table and the object; and
    a control section configured to change the location of the light emitting portion within the inner surface along the curved shape according to the distance measured by the range-finding section,
    wherein the image reading apparatus reads the image on or of the object through the imaging device detecting light reflected off the object.

2. An image reading apparatus according to claim 1, wherein
    the control section further changes an area of the light emitting portion within the inner surface to change an amount of the light on the light collection spot.

3. An image reading apparatus according to claim 2, wherein
    the control section changes the area of the light emitting portion within the inner surface while maintaining electric power that is supplied to the light source constant.

4. An image reading apparatus according to claim 1, wherein
    the control section changes the location of the light emitting portion within the inner surface so as to separate the light emitting portion from the flat surface of the table by a larger distance in response to the range-finding section measuring a larger distance.

5. An image reading apparatus according to claim 1, wherein
    the control section further determines whether or not the object is tridimensional, and permits actuation of the range-finding section when the control section determines that the object is tridimensional and does not permit actuation of the range-finding section when the control section determines that the object is not tridimensional.

6. An image reading apparatus according to claim 5, further comprising:
    a cover openable and closable relative to the table, wherein
    the control section determines whether or not the object is tridimensional based on an open or closed state of the cover.

7. An image reading apparatus according to claim 1, wherein
    the control section further determines whether or not the object is tridimensional and controls an amount of the light emitted from the light emitting portion on the light collection spot so that the amount is larger when the control section determines that the object is tridimensional than when the control section determines that the object is not tridimensional.

8. An image reading apparatus according to claim 1, wherein
    the control section further determines whether or not the object is shiny and causes the inner surface to entirely emit light when the control section determines that the object is shiny.

9. An image reading apparatus according to claim 8, wherein
    electric power that is supplied to the light source when the inner surface is caused to entirely emit light is equal to electric power that is supplied to the light source when the inner surface is caused to partially emit light from the light emitting portion.

10. An image reading apparatus according to claim 8, further comprising:
    an input section configured to receive input by a user,
    wherein the control section determines whether or not the object is shiny based on the input by the user.

11. An image reading apparatus according to claim 1, wherein
    the light source is a planar light source having a longitudinal axis and being bent along a direction perpendicular to the longitudinal axis, and
    the planar light source is formed from an organic electroluminescence element.

12. An image forming apparatus in which an image reading apparatus according to claim 1 is mounted, the image forming apparatus comprising:
    the image reading apparatus; and
    an image forming section configured to form an image based on data of an image read by the image reading apparatus.

13. A non-transitory computer-readable storage medium storing therein a program that causes a computer to control a location of a light emitting portion of a light source, wherein
    the light source includes an inner surface having a curved shape and emits light from at least the light emitting portion to an object on a flat surface of a table, the light emitting portion being a portion of the inner surface,
    the curved shape allows the location of the light emitting portion to be changed within the inner surface along the curved shape so that a light collection spot of the light shifts along a direction perpendicular to the flat surface of the table, and
    the program includes:
        first program code that causes the computer to cause a range-finding section to measure a distance between the flat surface of the table and the object; and
        second program code that causes the computer to change the location of the light emitting portion within the inner surface along the curved shape according to the distance measured by the range-finding section.

14. An image reading method for irradiating an object on a flat surface of a table with light that is emitted from a light source and reading an image on or of the object,
    the light source including an inner surface having a curved shape and being configured to emit light from at least a light emitting portion to the object, the light emitting portion being a portion of the inner surface,
    the curved shape allowing a location of the light emitting portion to be changed within the inner surface along the curved shape so that a light collection spot of the light shifts along a direction perpendicular to the flat surface of the table, the image reading method comprising:

measuring a distance between the flat surface of the table and the object;

changing the location of the light emitting portion within the inner surface along the curved shape according to the distance measured, and then irradiating the object on the flat surface of the table with the light emitted from the light emitting portion; and detecting light reflected off the object to read the image of the object.

* * * * *